United States Patent [19]

Long et al.

[11] Patent Number: 4,658,010

[45] Date of Patent: Apr. 14, 1987

[54] POLYIMIDE ADHESIVE AND METHOD OF MAKING FROM LACTAM, DIANHYDRIDE MIXTURE AND DIAMINE

[76] Inventors: John V. Long, 1756 Lexington Ave., El Cajon, Calif. 92121; John Gagliani, 6280 Lance Pl., San Diego, Calif. 92120

[21] Appl. No.: 727,127

[22] Filed: Apr. 25, 1985

[51] Int. Cl.$^4$ .............................................. C08G 69/14
[52] U.S. Cl. .................... 528/322; 428/473.5; 524/600; 524/611; 528/170; 528/179; 528/182; 528/187; 528/222; 528/223; 528/224; 528/229; 528/312; 528/313; 528/315; 528/323; 528/324
[58] Field of Search ............... 528/322, 323, 324, 224, 528/229, 222, 223, 170, 179, 182, 187, 312, 313, 315

[56] References Cited

U.S. PATENT DOCUMENTS

| | | | |
|---|---|---|---|
| 3,310,506 | 3/1967 | Amborski et al. | 521/128 |
| 4,183,839 | 1/1980 | Gagliani | 528/322 |
| 4,600,770 | 7/1986 | Gagliani et al. | 528/322 |

Primary Examiner—Harold D. Anderson
Attorney, Agent, or Firm—Frank D. Gilliam

[57] ABSTRACT

Methods of making modified polyimide adhesives and laminating compositions. These adhesives are also particularly useful as the matrix material in high strength fiber reinforced composites. The adhesive compositions are prepared by initially reacting an oxoimine with one or more tetracarboxylic acid dianhydrides, which is primarily 1, 2, 3, 4-butanetetracarboxylic acid dianhydride. The resulting bisimide is dissolved in a non-reactive solvent and a suitable diamine is added to react with the bisimide, producing a liquid resin solution which is essentially a polyamide resin solution. This solution is useful as an adhesive or a fiber composite matrix which can be cured to a polyimide at moderate processing temperatures. The final adhesive bond or matrix is found to be flexible, strong and very resistant to flame, high temperatures, oils and solvents.

11 Claims, No Drawings

POLYIMIDE ADHESIVE AND METHOD OF MAKING FROM LACTAM, DIANHYDRIDE MIXTURE AND DIAMINE

BACKGROUND OF THE INVENTION

This invention relates in general to polyimide resins and, more specifically, to modified polyimide resins suitable for use as high performance adhesives and as matrix materials for fiber-reinforced composite structures.

Our prior U.S. Pat. Nos. 4,442,283, 4,444,823, 4,183,838 and 4,183,839 disclose and claim certain polyimide compositions which are flame resistant and useful as coatings and adhesives. The coating and adhesive compositions described in the above-mentioned prior patents are made by first preparing a suitable bisimide by reacting an aromatic tetracarboxylic acid dianhydride with a cyclic amide or oxoimine. This bisimide has the typical general formula:

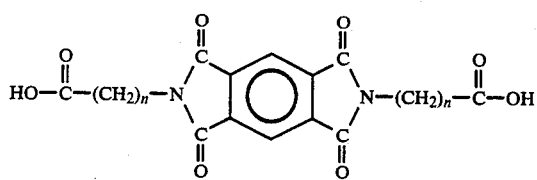

where "n" is a positive integer.

The polyimide forming material is then prepared by dissolving the bisimide in an inert solvent; then adding thereto a suitable diamine, producing a viscous fluid containing an intimate, unpolymerized mixture of N-substituted cyclic carboxy terminated bisimide, and diamine which is capable of being converted to a high molecular weight polymer through an exchange reaction by the application of heat.

The following is exemplary of the exchange reaction which occurs:

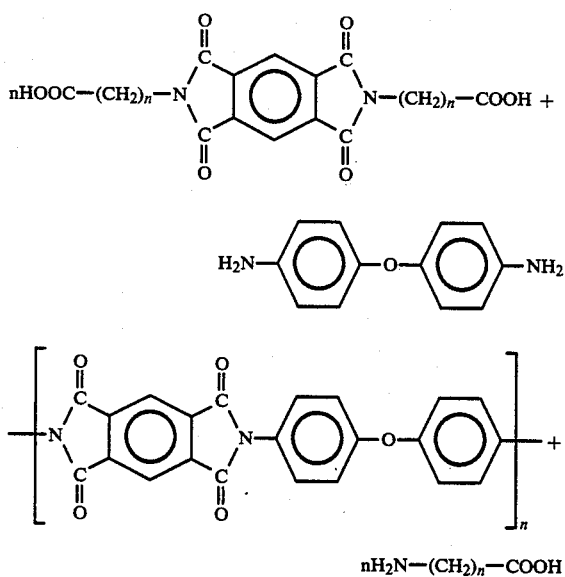

where "n" is a positive integer.

The coating produced is tough, highly adherent to various surfaces, with very few pinholes or bubbles. It has excellent peel strength and is resistant to high temperatures, peeling and abrasion.

These prior polyimide resins, however, are less than ideal for several adhesive applications and for impregnating fibers in the production of composite structures for several reasons. The prior resins tended to require undesirably high curing temperatures. At the higher temperatures the water and alcohol released during polymerization tended to form bubbles or voids in the thicker composite structures. Many of the prior adhesive solutions were monomeric rather than polymeric and therefore released large quantities of water and alcohol.

Thus, there is a continuing need for improved adhesives and matrix materials for fiber-reinforced composites having a better combination of low processing temperatures, lack of alcohols in the final reaction products and greater resistance to the formation of bubbles or voids in composite structures.

SUMMARY OF THE INVENTION

By making certain changes in the compositions and methods described in our above-referenced prior patents, we have found that a polyimide adhesive useful in bonding a variety of surfaces together and for bonding fibers in composite structures can be made which overcomes the problems noted above.

Our improved adhesive is made, basically, by the steps of reacting a suitable dianhydride, primarily 1,2,3,4-butanetetracarboxylic acid dianhydride (hereinafter "BTCA") with a suitable oxoimine to produce a bisimide, dissolving the bisimide in a non-reactive solvent, adding a suitable aromatic diamine and any desired additives, to produce a liquid which is primarily a polyamide/imide resin dissolved in the solvent, impregnating a fiber material or coating at least the first of two surfaces to be bonded with the liquid, pressing the fiber material in a mold or bringing the surfaces together and curing the adhesive at a temperature of from about 175° and 225° C. for about 5 to 120 minutes to produce a polyimide resin. A tough but flexible and elastic composite material or bond between the surfaces results.

DETAILED DESCRIPTION OF THE INVENTION

We have found that in order to produce a polymer having the desired low temperature processing properties and other physical properties, at least about 50 mole % of the dianhydride must be 1,2,3,4-butanetetracarboxylic acid dianhydride (BTCA). While it is often preferred that only BTCA be used, up to about 50 mole % of 3,3',4,4'-benzophenone tetracarboxylic acid dianhydride (hereinafter "BTDA"), pyromellitic dianhydride or a mixture thereof, may be used, if desired. For optimum results, at least about 0.5 mole % should be BTCA.

Any suitable oxoimine may be reacted with the selected dianhydride to produce the desired imide. Preferably, the oxoimine has the general formula:

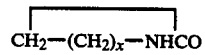

where "x" is a positive integer from 2 to 7. Of these, best results are obtained with caprolactam.

While any suitable reaction conditions may be used, we have obtained excellent results where the dianhydride is added to the oxoimine, the mixture is heated to about 150° to 200° C. until the condensation reaction is complete, about 30 to 90 minutes, then the non-reactive solvent is added.

The molar ratio of oxoimine to dianhydride should be in the 0.1:1 to 10:1 range. For best results the ratio of oxoimine should be from about 1:1 to 3:1. Optimum results are obtained where this ratio is about 2:1.

The bisimide produced by the preferred reaction of caprolactam and BTCA has the following general formula:

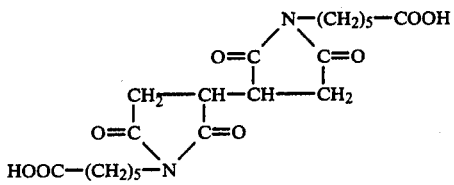

Any suitable non-reactive solvent may be used as the diluant for the bisimide. Typical solvents include N-methyl pyrrolidone, dimethyl formamide, dimethyl acetamide, dimethyl sulfoxide and mixtures thereof.

As pointed out in Example X of our U.S. Pat. No. 4,442,283, where a reactive, esterifying solvent is used, higher proportions of BTCA when mixed with smaller proportions of BTDA tended to lower the thermal stability of the coating. With the non-reactive solvents of this invention and the processing conditions described below, an excellent adhesive and fiber reinforced composited matrix material can be produced even with 100% BTCA.

Once the solvent and bisimide are mixed (or the solvent with the bisimide-producing reactants) the selected aromatic diamine or diamines are added to the solution. Preferrably an approximately stoichiometric quantity of diamine is used.

Any suitable aromatic diamine may be used. Typical aromatic diamines include 4,4'-diamino diphenyl ether, 4,4'-(p-phenylenediisopropylidene)bisaniline, 4,4'-diaminodiphenyl oxide, 4,4'-diaminodiphenyl methane, m. phenylene diamine, p. phenylene diamine, 4,4'-(m. phenyllenediisopropylene)bisaniline, and mixtures thereof.

While any suitable reaction conditions may be used, it is preferred that the mixture be stirred for about 30 to 60 minutes at about 40° C. to 60° C. to assure completion of the reaction between the diamine and the bisimide. It is believed that at this point the liquid mixture is essentially a polyimide amide resin dissolved in the solvent, which is capable of curing, with heat, to a polyimide resin with the evolution of water.

Additives to improve various characteristics of the final adhesive may be added as desired. Any appropriate additives may be used, such as fillers, and surfactants. Typical surfactants include Dow Corning Group. 190 or 193, FC430 from Minnesota Mining & Manufacturing Co., Zonyl FSC from E. I. dePont de Nemours & Co., and L550 from Union Carbide Corp. While any suitable concentration may be used, from about 0.01 to 2% (by weight, based on the weight of the solution prior to drying) is preferred. Of these surfactants, best results have been obtained with FC430. Fillers and reinforcing additives may be added. Typical fillers include Kevlar aramid fibers, graphite fibers, glass fibers, carbon and graphite powders, Teflon fluorocarbon powders, metal powders and mixtures thereof.

Macroballoons having diameters of about 0.1 to 10 mm may be mixed into the adhesive in any desired quantity. Small quantities thicken the adhesive, while relatively large quantities result in castable material suitable for the manufacture of light weight, strong, flame resistant shapes. Typical macroballoon compositions include ceramics, metals and synthetic resins.

The solution may be partially dried to thicken the solution prior to application to the surfaces to be bonded, if desired. Or, the solution may be coated onto one or both of the surfaces to be bonded, then partially dried to a tacky state to remove the solvents prior to bringing the surfaces together and drying the resin.

In a preferred bonding method, the solution is coated onto one or both of the surfaces to be bonded together and the solvent is evaporated, typically at a temperature of about 70° to 150° C. for about 10 to 60 minutes. The surfaces may then be brought together and cured, as described below, or the adhesive film(s) may be further dried and pre-cured to flexible, non-tacky films by heating them to a temperature of from about 150° to 225° C. for about 30 to 60 minutes. In either case, with or without the precure step, final cure is obtained by bringing the surfaces to be bonded together at a temperature of from about 200° to 300° C. for about 30 to 120 minutes, with a pressure of from about 10 to 1000 psig applied for at least about the first 2 to 20 minutes. A high strength, flexible, flame and heat resistant polyimide resin bond is achieved.

This adhesive may be used to bond any suitable surfaces by any suitable method. Strong adhesive bonds are formed, for example, between aluminum/aluminum, steel/steel, titanium/titanium and any combination thereof. Glass and many ceramics may also be adhesively bonded. Any suitable coating technique may be used to apply the adhesive, such as spray, roller or brush coating.

The adhesive composition is especially useful for impregnating porous sheets, such as matted high strength fiber fabrics or sheets, containing fibers such as glass, graphite, aramid, boron or mixed fibers. The porous sheets are preferably first impregnated, such as by dipping, with the adhesive solution, which is dried sufficiently to drive off residual solvent. The tacky sheets may then be stacked in a desired arrangement and shape, a pressure of about 20 to 1000 psig is applied and the assembly is heated to about 175° to 320° C. for about 30 to 120 minutes to cure the polyimide resin. A well-consolidated composite structure results, substantially free of bubbles or voids.

As discussed above in conjunction with the use of this resin solution as an adhesive, the impregnated porous sheets can be pre-cured, if desired, at a temperature of about 150° to 225° C., for about 30 to 60 minutes to produce flexible, non-tacky, fiber-reinforced sheets which can be stored, shipped, etc., prior to assembly in stacks in a mold for further consolidation and shaping. It is often preferred that the pre-cure be done under pressure of about 10 to 1000 psig between polished platens to produce smooth sheets of uniform thickness substantially free of bubbles or voids within the sheets.

Since no alcohol (only water) is produced as a by-product of the final polyimide-forming reaction, problems of outgasing during cure and of voids in the final fiber reinforced composite product are greatly reduced in comparison to other processes.

Details of the invention will be further understood upon reference to the following examples, which describe preferred embodiments of the methods and compositions of this invention. All parts and percentages are by weight, unless otherwise indicated.

EXAMPLE I

About 198.1 g. (1M) of 1,2,3,4-butanetetracarboxylic acid dianhydride (BTCA) and about 226.2 g. (2M) caprolactam are placed in a liter flask, heated to about 175° C. and maintained at that temperature for about 30 minutes. The mixture is cooled to about 100° C. and 300 g. of N-methyl pyrrolidone is added and the mixture is stirred until homogeneous. The solution is cooled to about 45° C. and about 198.1 g. (1M) 4,4'-diaminodiphenyl methane is added to the mixture which is stirred for about 50 minutes at about 50° C. Additional N-methyl pyrrolidone is added to thin the solution to the desired viscosity. The liquid resin is brushed onto one surface of each of two aluminum plates to a thickness of about 4 mils and is dried in an air circulating oven at about 95° C. for about one hour. The coated sheets are pre-cured at a temperature of about 175° C. for about 40 minutes, resulting in flexible, non-tacky, coatings on the surfaces. The coated surfaces are then brought together in a press and pressed at about 400 psig while the temperature is increased to about 260° C. and held for about 10 minutes. The pressure is released and the temperature is continued for about one hour. The plates are found to be very securely bonded together. The lap shear strength value of the aluminum-to-aluminum bond is about 1500 psi at room temperature.

EXAMPLE II

The procedures of Example I are repeated except that the plates being bonded are: II(a) titanium-to-titanium, II(b) steel to steel, II(c) steel to aluminum and II(d) glass to glass. In each case an excellent bond is achieved, with shear strength values exceeding 1000 psi.

EXAMPLE III

The procedures of Example I are repeated with four additional samples, varying only the quantity of caprolactam. Where Example I used 226.2 g.; (2M) caprolactam, to give a molar ratio of caprolactam to BTCA of about 2:1, these four additional tests use caprolactam quantities of about: III(a) 56.5 g.; (0.5M, 0.5:1 ratio), III(b) 113 g. (1M, 1:1 ratio), III(c) 452 g. (4M, 4:1 ratio), and III(d) 678 g. (6M, 6:1 ratio). The characteristics of the adhesive products in these tests are excellent overall for these tests. The adhesive of Example III(b) has the best shear strength. This demonstrates that for best results the ratio of oxoimine to aromatic dianhydride should be in the range of about 1:1 to 3:1.

EXAMPLE IV

The procedure of Example I are repeated, except that in place of N-methyl pyrrolidone, the following solvents are used: IV(a) dimethyl formamide, IV(b) dimethyl acetamide, IV(c) ethanol, IV(d) acetone. In each of IV(a) and IV(b) where a non-reactive solvent is used, an excellent adhesive results. Where a reactive solvent is used, in IV(c), the adhesive has problems with excess volatiles during curing. Example IV(d) did not produce a clear solution.

EXAMPLE VII

The procedures of Example I are repeated with three additional samples, the only difference being the addition of a surfactant. In these examples the following surfactants are added after the diamine is added: VII(a) 10 g. of Zonyl FSC fluorocarbon, VII(b) about 8 g. Dow Corning 190 silicone surfactant, VII(c) about 10 g. FC430. With these surfactants, the uniformity of the dried adhesive is improved.

EXAMPLE VII

The steps of Example I are repeated, except that the BTCA and caprolactam are mixed together with the N-methyl pyrrolidone and the mixture is heated to produce the bisimide. The subsequent steps of Example I are then repeated. An excellent adhesive results.

EXAMPLE IX

The procedures of Example I are repeated, except that in place of the BTCA, the following mixtures are used: IX(a) 99 g. (0.5M) BTCA and 161 g. (0.5M) 3,3',4,4'-benzophenone tetracarboxylic acid dianhydride (BTDA), IX(b) 49.5 g. (0.25M) BTCA and 241 g. (0.75M) BTDA, IX(c) 149 g. (0.75M) BTCA and 80.5 g. (0.25M) BTDA. An excellent adhesive is produced in IX(c) and a good adhesive in IX(a). In IX(b) using more than 50 mole % BTDA problems are found with the higher temperatures required for processing the resin and achieving good bonding.

EXAMPLE X

The procedures of Example I are repeated down to the coating of the adhesive solution onto aluminum plates. Instead, the solution is coated onto a narrow strip of Kapton film from duPont and the solvent is evaporated at a temperature of about 125° C. for about 30 minutes. The imide is then cured at about 200° C. for about 30 minutes. The result is a flexible, non-tacky, coated Kapton tape which is flexible at room temperature. The tape is tightly wrapped around a copper wire in an overlapping spiral manner and heated to about 500° C. for about 10 minutes. A well bonded, electrically insulating, high temperature resistant covering results.

EXAMPLE XI

Samples of the adhesive of Example I are prepared up to the first drying step. These samples are used to thoroughly impregnate fabric swatches as follows: XII(a) a tow of high-strength graphite fibers, available from Union Carbide under the "Thornel" trademark are dipped in the resin liquid and placed in a mold, XII(b) five sheets of woven glass fabric cloth are soaked in the resin liquid and stacked in a press mold, XII(c) two sheets of woven Kevlar aramid fiber from duPont and a sheet of glass fiber mat are soaked in the liquid resin and placed in a mold with the mat between the fabric sheets. In each case solvents are first evaporated by heating the molds to a temperature of about 120° C. for about one hour, then the resin is cured by heating at about 220° C. for about four hours under about 100 psig pressure. In each case a high strength, well consolidated and bonded composite structure with few voids results.

Although specific components, proportions and conditions have been specified in the above examples, these may be varied with similar results, where suitable. In addition, other materials may be added to the resin material, such as adhesion promoters, fillers, colorants ultraviolet absorbers, or the like.

Other applications, modifications and ramifications of the present invention will occur to those skilled in the art upon reading the present disclosure. These are intended to be included within the scope of the invention, as defined in the appended claims.

We claim:

1. The method of preparing a polyimide composition useful as an adhesive or a matrix material for fiber reinforced composite structure which comprises the steps of:

providing an oxoimine having the general formula:

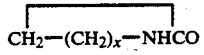

wherein
x is an integer from 2 to 7;
mixing with said oxoimine a tetracarboxylic acid dianhydride;
the mole ratio of oxoimine to dianhydride being from about 0.1:1 to 3:1;
said dianhydride comprising at least about 50 mole % 1,2,3,4-butane tetracarboxylic acid dianhydride and from about 0.5 to about 50 mole % of a dianhydride selected from the group consisting of 3,3',4,4'-benzophenone tetracarboxylic acid dianhydride, pyromellitic dianhydride and mixtures thereof;
heating the mixture to a temperature of from about 150° to 200° C. for about 30 to 90 minutes to produce at least one bisimide;
adding to said mixture, either before or after said heating step, at least about 30 wt.% of a non-reactive solvent, based on weight of the solids, said solvent being capable of dissolving, without reacting with, said oxoimine, dianhydride and bisimide;
adding to said mixture after said heating and solvent addition a substantially stoichiometric quantity of a diamine; and
stirring the resulting mixture for about 20 to 60 minutes at a temperature of from about 40° to 60° C.;
whereby a polyamide adhesive solution capable of forming a polyimide upon heating results.

2. The method according to claim 1 wherein said oxoimine is caprolactam.

3. The method according to claim 1 wherein said solvent is selected from the group consisting of N-methyl pyrrolidone, dimethyl formamide, dimethyl acetamide, dimethyl sulfoxide and mixtures thereof.

4. The method according to claim 1 wherein said diamine is selected from the group consisting of: 4,4'-diamino diphenyl ether, 4,4'-(p-phenylenediisopropylidene)bisaniline, 4,4'-diaminodiphenyl methane, m.-phenylene diamine, p.-phenylene diamine, 4,4'-(m. phenylenediisopropylene)bisaniline, and mixtures thereof.

5. The method according to claim 1 further including the step of adding to the mixture prior to initial heating from about 0.01 to 2 weight % of a surfactant based on the weight of the mixture.

6. An adhesive composition comprising a mixture of:
the reaction product of a polyamide-forming reaction between:
(a) a diamine, and
(b) a bisimide resulting from the reaction of an oxoimine having the general formula:

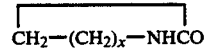

wherein
x is an integer from 2 to 7; and a tetracarboxylic acid dianhydride comprising at least about 50 mole % 1,2,3,4-butane tetracarboxylic acid dianhydride and from about 0.5 to about 50 mole % of a dianhydride selected from the group consisting of 3,3',4,4'-benzophenone tetracarboxylic acid dianhydride, pyromellitic dianhydride and mixtures thereof, the mole ratio of oxoimine to dianhydride being from about 0.1:1 to 3:1; and
a non-reactive solvent in which said diamine, bisimide dianhydrides and reaction product are soluble.

7. The adhesive composition according to claim 6 wherein said oxoimine is caprolactam.

8. The adhesive composition according to claim 6 wherein said solvent is selected from the group consisting of N-methyl pyrrolidone, dimethyl formamide, dimethyl acetamide, dimethyl sulfoxide and mixtures thereof.

9. The adhesive composition according to claim 6 wherein said dianhydride is substantially entirely 1,2,3,4-butane tetracarboxylic acid dianhydride.

10. The adhesive composition according to claim 6 wherein said diamine is selected from the group consisting of 4,4'-diamino diphenyl ether, 4,4'-(p-phenylenediisopropylidene)bisaniline, 4,4'-diaminodiphenyl methane, m.-phenylene diamine, p.-phenylene diamine, 4,4'-(m. phenylenediisopropylene)-bisaniline, 2,2-bis[4-(4-aminophenoxy)phenyl]hexafluoropropane and mixtures thereof.

11. The adhesive composition according to claim 6 further including from about 0.01 to 2 wt. % of a surfactant based on the weight of the mixture.

* * * * *